US 8,079,850 B2

(12) United States Patent
Akahori et al.

(10) Patent No.: US 8,079,850 B2
(45) Date of Patent: Dec. 20, 2011

(54) ELECTRIC CONNECTION BOX

(75) Inventors: Masahiro Akahori, Shizuoka (JP);
Toshinori Iwai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/320,678

(22) Filed: Feb. 2, 2009

(65) Prior Publication Data

US 2009/0203236 A1    Aug. 13, 2009

(30) Foreign Application Priority Data

Feb. 8, 2008   (JP) .................... 2008-028379

(51) Int. Cl.
*H01R 12/00* (2006.01)
(52) U.S. Cl. ....................................... 439/76.1
(58) Field of Classification Search ............ 439/76.1, 439/76.2, 79, 80
See application file for complete search history.

(56) References Cited

U.S. PATENT DOCUMENTS 2,097,480 A * 11/1937 Visser ...................... 312/246
5,651,683 A * 7/1997 Shimamura et al. ........... 439/34

FOREIGN PATENT DOCUMENTS

JP    2005-006498    1/2005

OTHER PUBLICATIONS

Office Action issued Oct. 13, 2010, for Chinese Patent Application No. 200910005729.7.

* cited by examiner

*Primary Examiner* — Tulsidas C Patel
*Assistant Examiner* — Phuong Nguyen
(74) *Attorney, Agent, or Firm* — Edwards Wildman Palmer LLP (57) ABSTRACT

An electric connection box including a box main body, an integration mounted at the box main body, a pair of connection devices, and a plurality of ribs. The pair of connection devices are structured with one of connection devices provided at the integration and the other of connection devices provided at the box main body. The plurality of ribs are arranged at the box main body, and abuts on the integration and is deformed when the integration is mounted at the box main body so as to prevent rattling of the integration. Second ribs among the plurality of ribs, which are arranged close to the other of connection devices, are formed stiffer than first ribs arranged away from the other of connection devices farther than the first ribs.

4 Claims, 6 Drawing Sheets

ELECTRIC CONNECTION BOX

BACKGROUND OF THE INVENTION

1. Field of the Invention

The present invention relates to an electric connection box mounted in a car as a vehicle.

2. Description of the Related Art

In a car as the vehicle, various electronic devices, such as a lamp like a head lamp or a tail lamp, a motor like a starter motor or a motor for an air conditioner, are mounted.

Junction blocks are arranged at suitable positions in the car for supplying electric power to the various electronic devices. Each of the junction blocks is structured integrally with various electric circuit units such as many fuses and relays.

Because a junction block includes a fuse, a relay and bus bar, it is called a fuse block, a relay box or an electric connection box as a generic name. In this description, the fuse block, the relay box and junction block are called the electric connection box as a generic name hereafter.

The electric connection box includes a box main body forming an outer shell, and an electric unit mounted at the box main body (for example, Patent document 1). The box main body is formed with an insulation synthetic resin into a box shape. The box main body is provided with a mount portion for mounting the electric unit. The electric unit is, for example, a relay, a fuse, and a power integration as a power distribution unit.

The box main body and the power integration are respectively provided with a connection device to be a pair of connection devices. The pair of connection devices are electrically connected to each other so as to supply electric power from a power supply such as a battery or a generator to the power integration when the power integration is mounted at the box main body. The electric power is distributed by a semiconductor or a relay in the power integration through a wiring harness connected to the power integration and supplied to the various electronic devices.

The power integration in the electric connection box mounted in the car is caused to rattle in the mount portion of the box main body by vibration of the car. Rattling of the power integration may cause a load at a soldering connection in the power integration to generate a crack, and may wear a terminal at the connection devices to result in connection failure.

For solving such problems, for example, a plurality of ribs for preventing rattling are provided at an inner wall of the mount portion. The plurality of ribs are formed into the same shape. When the power integration is mounted in the mount portion, the ribs abut on the power integration and are deformed. The deformed ribs hold the power integration with a pressing force to prevent the rattling. Japan Patent Application published No. 2005-6498 is referred as Patent Document 1.

SUMMARY OF THE INVENTION

The plurality of ribs provided in the mount portion are formed into the same shape, so that, when ribs closer to the connection device of the box main body are deformed more than the other ribs when the power integration is mounted in the box main body, positioning the connection devices to each other becomes difficult and it becomes difficult to fit the connection devices to each other. In this situation, rattling of the connection devices will become more severe.

According to the above problems, an object of the present invention is to provide an electric connection box, which can position and connect securely a pair of connection devices and can prevent wholly rattling of electric units mounted in a box main body of the electric connection box.

In order to overcome the above problems and attain the object of the present invention, an electric connection box according to the present invention includes a box main body; an electric unit mounted at the box main body; a pair of connection devices, one of the pair of connection devices being mounted to the box main body, the other of the pair of connection devices being mounted to the electric unit, the pair of connection devices being connected to each other when the electric unit is placed in the box main body; and a plurality of ribs arranged to at least one of the box main body and the electric unit, the ribs being deformed so as to prevent rattle motion of the electric unit in the box main body when the electric unit is placed in the box main body, and ribs arranged closer to the connection device from among the plurality of ribs are formed to be stiffer than other ribs from among the plurality of ribs other than the ribs arranged closer to the connection device.

The electric connection box according to the present invention is characterized in that a cross-sectional shape of the plurality of ribs taken along a direction intersecting a lengthwise direction of the ribs is a triangle.

The electric connection box according to the present invention is characterized in that an angle at a vertex of each of the ribs arranged closer to the connection device is formed to be greater than an angle at a vertex of each of the other ribs other than the ribs arranged closer to the connection device.

According to the present invention, the electric connection box includes the plurality of ribs arranged to at least one of the box main body and the electric unit, and the ribs are deformed so as to prevent rattle motion of the electric unit in the box main body when the electric unit is placed in the box main body, and the ribs arranged closer to the connection device from among the plurality of ribs are formed to be stiffer than other ribs from among the plurality of ribs other than the ribs arranged closer to the connection device. Therefore, the ribs arranged closer to the connection device cannot be deformed easily, so that the pair of connection devices is preferentially positioned and connected securely. The plurality of ribs can prevent ratting of the electric units against the box main body.

According to the present invention, the cross-sectional shape of the plurality of ribs taken along the direction intersecting the lengthwise direction of the ribs is a triangle, so that the ribs can be deformed easily, and rattling of the electric units can be prevented securely.

According to the present invention, the angle at the vertex of each of the ribs arranged closer to the connection device is formed into larger than then angle at the vertex of each of the other ribs other than the ribs arranged closer to the connection device. Therefore, the ribs arranged closer to the connection device can be securely formed to be stiffer than the other ribs other than the ribs arranged closer to the connection device.

The above and other objects and features of this invention will become more apparent from the following description taken in conjunction with the accompanying drawings.

DESCRIPTION AN EXEMPLARY EMBODIMENT

An electric connection box of an embodiment according to the present invention will be described with reference to FIGS. 1-6. The electric connection box 1 is mounted on a car as a vehicle. The electric connection box 1, as shown in FIGS. 1 and 2, includes a box main body 2, a power integration 3 (corresponding to an electric unit, and call simply the integration 3, hereafter) in FIG. 2, a wiring block 4 and a pair of connection devices 5, 6 in FIG. 2.

Figure 1:
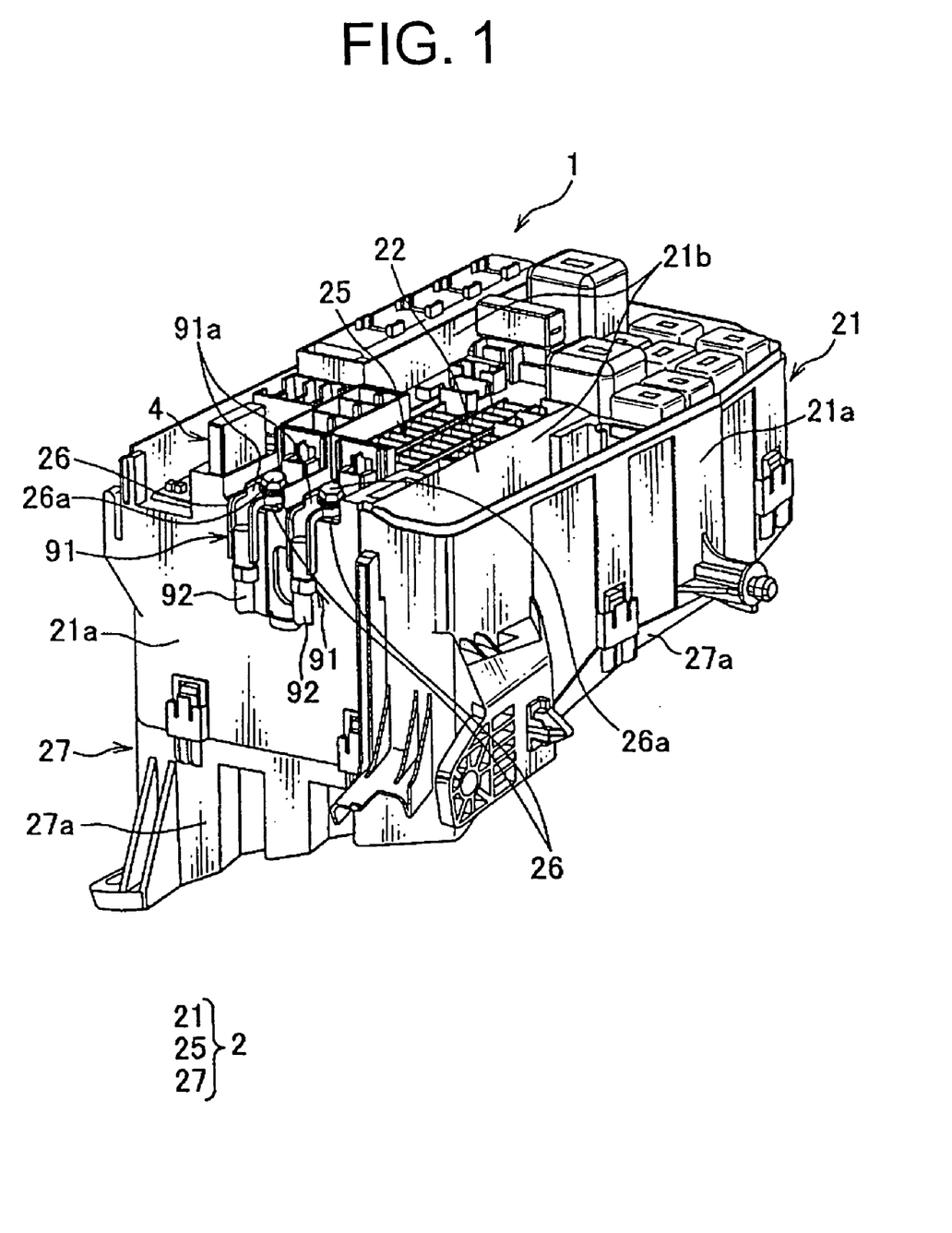
FIG. 1 is a perspective view of an electric connection box of a first embodiment according to the present invention.

The box main body 3 includes a main body 21, a cassette block 25, an upper cover (not shown) and a lower cover 27 as shown in FIG. 1. The main body 21 is made of insulation synthetic resin and formed by injection molding. The main body 21 is formed into a cylindrical shape with a plurality of outer walls 21a to be continued to each other. The main body 21 has a partition wall 21b partitioning an inside of the main body 21.

The main body 21 is provided at a top area thereof with a mount block 22, in which the integration 3, relays and fuses are mounted. The main body 21 is provided at a bottom area thereof with a connecting section (not shown) in which a connector of a wiring harness (not shown) is fitted. The main body 21 receives a bus bar, which electrically connects relays and fuses, which are mounted in the mount block 22, and terminals of the connector of the wiring harness fitted in the connecting section in a predetermined connecting circuit.

Figure 2:
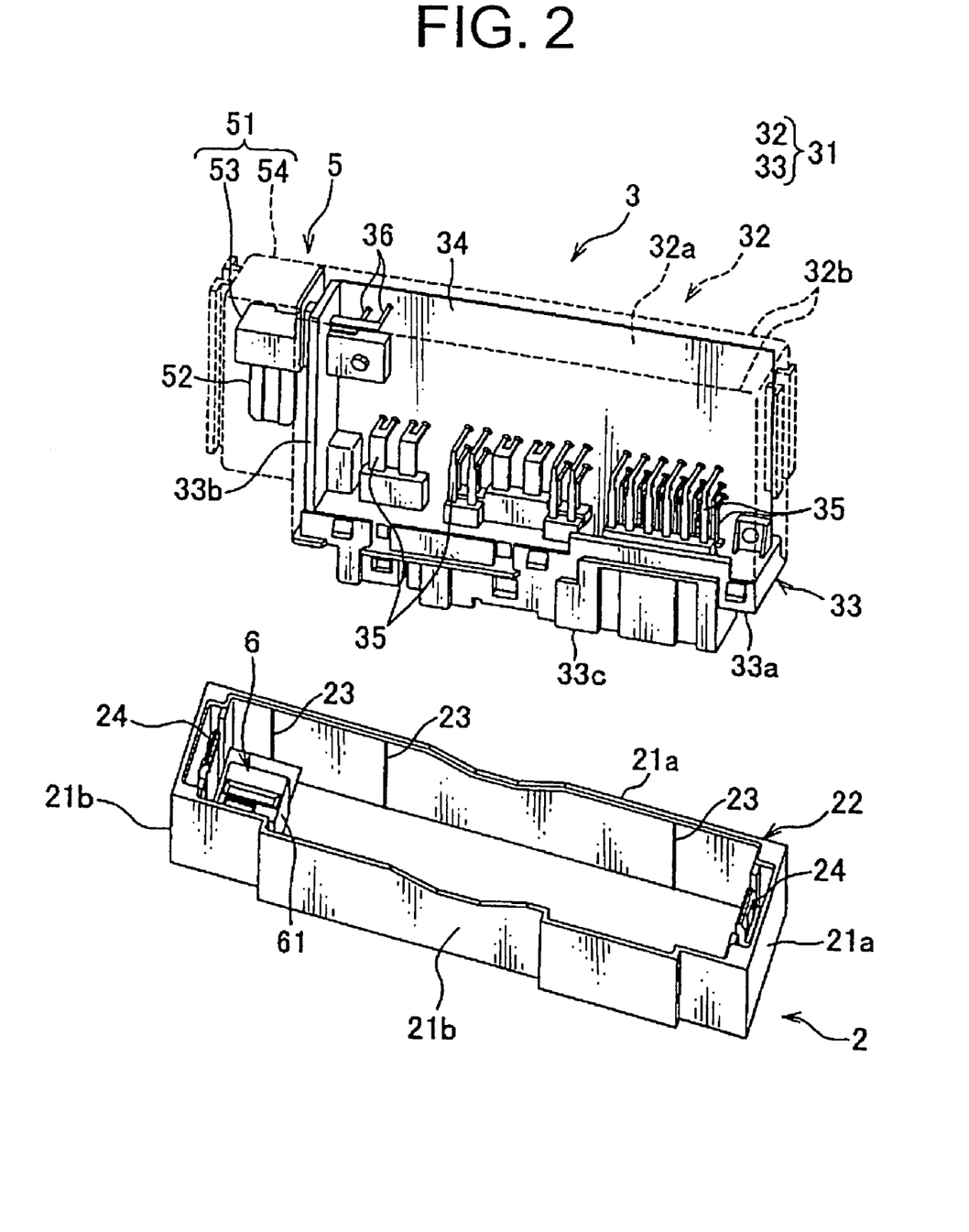
FIG. 2 is a perspective view of a power integration and a mount block of the power integration of the electric connection box in FIG. 1.
Figure 3:
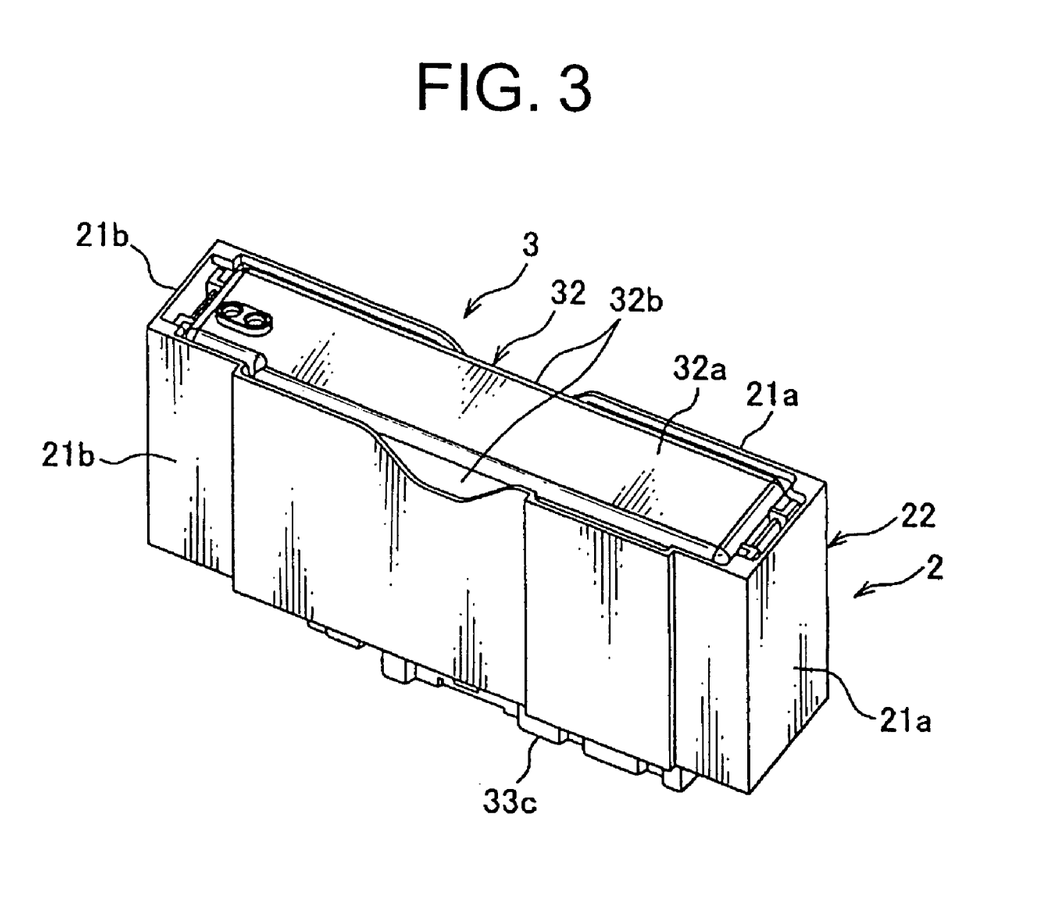
FIG. 3 is a perspective view of the power integration mounted at the mount block shown in FIG. 2.

The mount block 22 is formed into a cylindrical shape with the outer walls 21a and the partition wall 21b as shown in FIGS. 2, 3, and the integration 3 is mounted in the mount block 22. The mount block 22 is provided with a first rib 23 and a lock arm 24.

Figure 4:
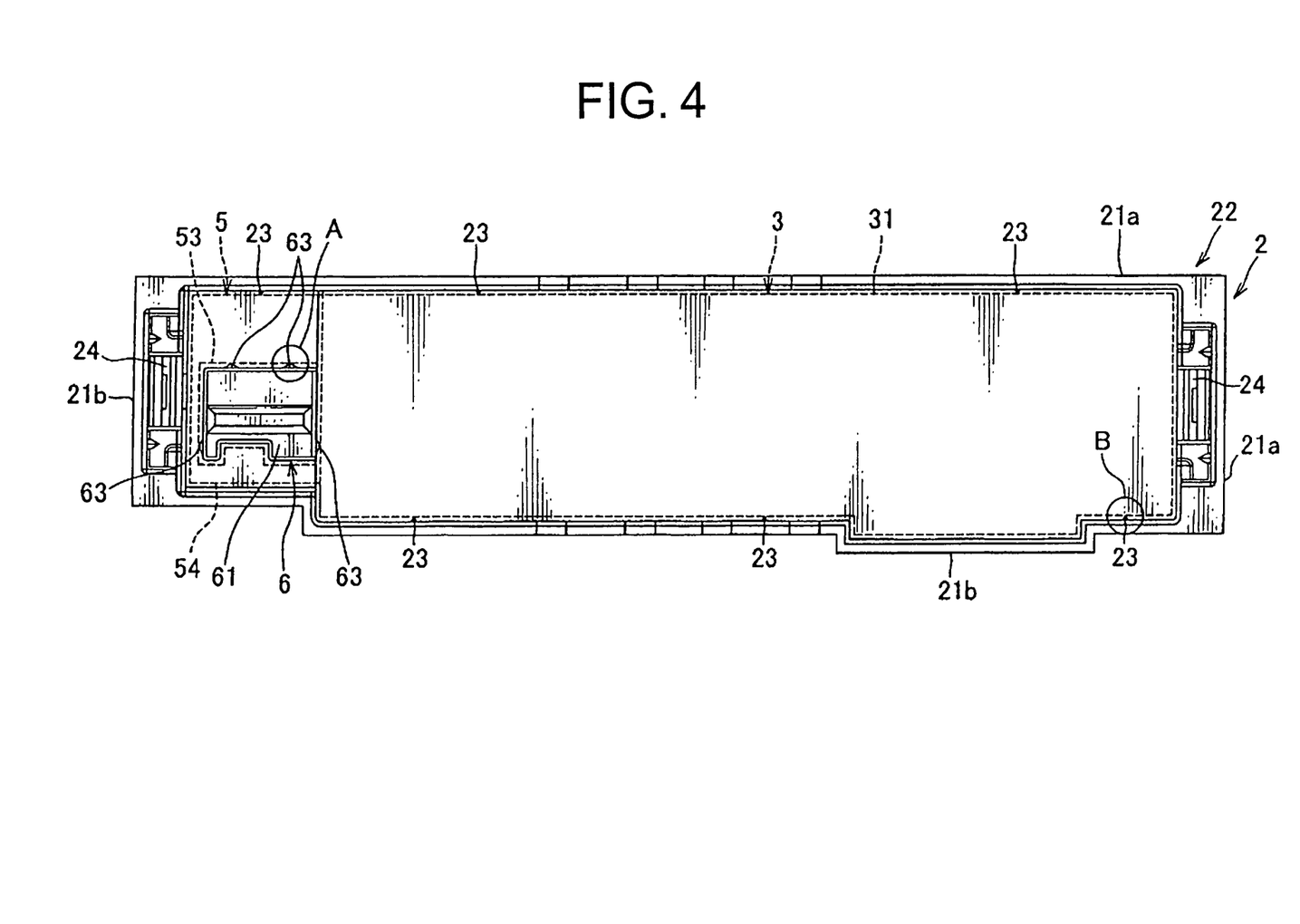
FIG. 4 is a top view of the mount block of the power integration shown in FIG. 2.
Figure 6:
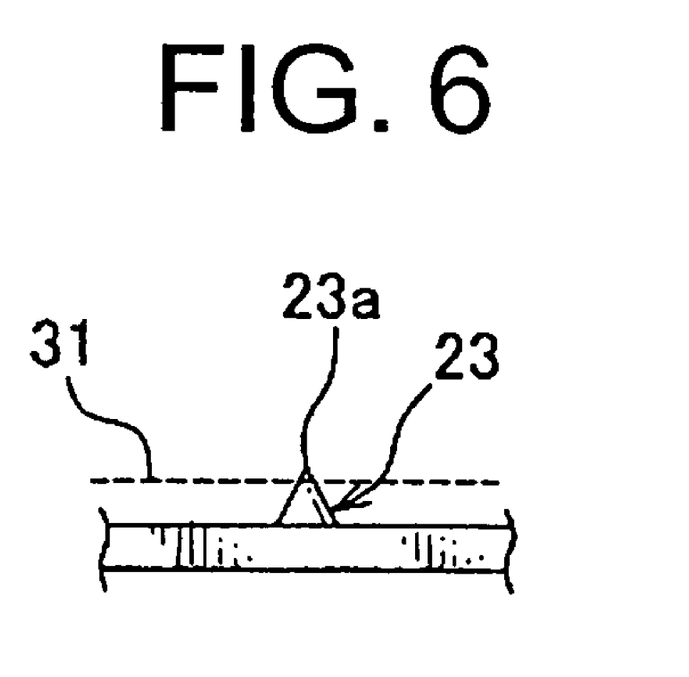
FIG. 6 is a top view expanding area B in FIG. 4.

A plurality of the first ribs 23 are provided on an inner wall of the mount block 22 as shown in FIG. 4. In other words, the first ribs 23 are provided at the box main body 2. The first ribs 23 are arranged on a pair of inner walls corresponding to each other along a lengthwise direction of the mount block 22. The first ribs 23 extend in parallel with each other along a mount direction in which the integration 3 is mounted toward the main body 21. A cross-section taken along a direction perpendicular to a lengthwise direction of the first rib 23 is a triangle. The first ribs 23 project toward an inside of the mount block 22 so as to penetrate into an outer surface of a later-described case 31 of the integration 3 to be mounted in the mount block 22, as shown in FIG. 6.

When the integration 3 is mounted in the box main body 2, the first ribs 23 structured above abut on the case 31 of the integration 3 and are deformed by the integration 3 so as to touch on the outer surface of the case 31. The first ribs 23 touch continuously along a single line of contact on the outer surface of the integration 3, so that rattling of the integration 3, especially in a direction of a widthwise of the mount block 22, can be prevented.

A pair of lock arms 24 is provided on the inner walls of the mount block 22. The pair of lock arms 24 is arranged on a pair of inner walls, which is located with a distance along the direction of the lengthwise of the mount block 22 and corresponds to each other. The lock arms 24 extend in parallel with each other along the mount direction in which the integration 3 is mounted toward the main body 21. One end at a deep side along the mount direction of the lock arm 24 is continued to the main body 21, and the other end of the lock arm 24 is a free end. The lock arm 24 can be elastically deformed freely so as to make the other end close to the inner wall of the mount block 22. When the integration 3 is mounted in the box main body 2, the lock arms 24 push the integration 3 along the direction of lengthwise of the mount block 22 by elastic restoring forces.

The cassette block 25 is made of an insulation synthetic resin and formed into a box shape which can be received in the main body 21. The cassette block 25 is received through an opening at a bottom area of the main body 21 in the main body 21. The cassette block 25 is provided with a bus bar receiving groove with a slit shape for receiving later-described first and second bus bars of the wiring block 4.

At a top surface of the cassette block 25, a mount section in which relays and fuses are mounted is arranged. At a bottom surface of the cassette block 25, a connecting section in which the connector of the wiring harness is fitted is provided.

The wiring harness includes a plurality of electric wires and connectors joined at ends of the electric wires. The connectors respectively fit in connector sections of the above mentioned main body 21 and the cassette block 25, and a later-described connector section 33c of the integration 3, and various electronic devices installed in a car.

At the top surface of the cassette block 25, two terminal mount sections 26 are provided. The terminal mount sections 26 are located at an end of the bus bar receiving groove. The terminal mount section 26 is formed flat at a surface thereof. At the terminal mount section 26, a nut (not shown) is embedded.

On the surface of the terminal mount section 26, later-described connecting tabs of the first and second bus bars and an electric contact 91a of a later-described terminal 91 connected with a power source are stacked in order. A bolt 26a goes through an opening of the connecting tab and a hole of the electric contact 91a, and is screwed into the nut, so that the terminal 91 is mounted by clamping the electric contact 91a between the connecting tab and a bolt head of the bolt 26a.

The upper cover is made of insulation synthetic resin and formed by injection molding. The upper cover includes a plurality of outer walls continued to each other so as to be formed into a cylindrical shape having a bottom. The upper cover is mounted at the main body 21 so as to cover the top area of the main body 21.

The lower cover 27 is made of insulation synthetic resin and formed by injection molding. The lower cover includes a plurality of outer walls 27a continued to each other so as to be formed into a cylindrical shape having a bottom. The lower cover is mounted at the main body 21 so as to cover the bottom area of the main body 21.

By mounting the relays and the fuses at the cassette block 25, mounting the cassette block 25 at the main body 21, fitting the connector of the wiring harness, mounting the terminal 91 on the terminal mount section 26, and mounting the upper and lower covers on the main body 21, the box main body 2 receives the relays, the fuses and the terminal 91.

The integration 3 includes the case 31, a baseboard unit 34 received in the case 31, semiconductors and relays mounted at the baseboard unit 34, terminals 35, 36 to be connected to the baseboard unit 34 and the one of connection devices 5.

The case 31 includes an upper case 32 and a lower case 33, and is formed into a box shape. The upper case 32 is made of insulation synthetic resin. The upper case 32 has a top wall 32a formed into a rectangular shape viewed from top and a plurality of side walls 32b continued to surrounding edges of the upper case 32a, and is formed into flat cylindrical shape with a bottom. One side wall 32b of the plurality of side walls 32b is provided at an outer surface thereof with a lock projection engaging with the lock arm 24 provided at the mount block 22 of the box main body 2.

The lower case 33 is made of insulation synthetic resin. The lower case 33 includes a bottom wall 33a formed into a rectangular shape viewed from top and a side wall 33b extending from one edge of the bottom wall 33a so as to form L-shape.

The bottom wall 33a is formed about a lengthwise dimension substantially same as a long side of the baseboard unit 34. At a bottom surface of the bottom wall 33a, the connector section 33c to be fitted with the connector of the wiring harness is provided. The side wall 33b is formed about a height thereof substantially same as a height of the baseboard unit 34. The baseboard unit 34 is joined with the bottom wall 33a and the side wall 33b, thereby the baseboard unit 34 is assembled with the lower case 33. The upper case 32 is attached to the lower case 33.

The baseboard unit 34 is formed into a flat rectangular plate shape as viewed from top. The baseboard unit 34 includes a pair of printed circuit boards and a conductive plate located between the pair of printed circuit boards, and formed integrally by stacking them to each other. Each of the pair of printed circuit boards has a similar structure. So, one of the pair of circuit boards will be described.

The printed circuit board includes a baseboard and a wiring pattern provided on a surface of the baseboard for forming a predetermined circuit. The baseboard is made of insulation synthetic resin and formed into a flat rectangular plate shape viewed from top. The wiring pattern is formed by bonding a thin metallic film of conductive material such as copper.

The conductive plate is made of conductive metallic material such as copper. The conductive plate is formed into a rectangular plate shape viewed from top. Sizes and a shape of the conductive plate about top view is formed substantially same as the shape of the pair of printed circuit boards. The conductive plate is separated so as to form a predetermined circuit.

The baseboard unit 34 is provided with a through hole penetrating the baseboard unit 34. The through hole has a plated layer on an inner surface thereof for electrically connecting the conductive plate and each of wiring patterns of the printed circuit boards.

The terminals 35, 36 are formed about across-section thereof into an L-shape by bending a sheet metal. Plural terminals 35, 36 are respectively provided. One end of each of terminals 35, 36 is inserted into the through hole and electrically connected with the baseboard unit 34 by soldering. The other end of the terminal 35 penetrates into the connector section 33c so as to connect with the connector of the wiring harness. The other end of the terminal 36 connects with one of connection devices 5. The one of connection device 5 will be described later in detail.

When the integration 3 structured above is mounted on the box main body 2, electric power from a later-described power source is supplied to the one of connection devices 5 through the terminal of the other of connection devices 6. The electric power is inputted through the terminal 36 into the baseboard unit 34. In the baseboard unit 34, the electric power is distributed to be supplied through semiconductors and relays to the terminal 35. The integration 3 supplies electric power through the connector of the wiring harness fitted in the connector section 33c to each of the electronic devices. Thus, the integration 3 distributes the electric power from the power source to each of the electronic devices.

The wiring block 4 includes the first bus bar, the second bus bar, a fuse provided between the first and second bus bars, and terminals.

The first and second bus bars are formed by conductive sheet metal. The first and second bus bars have similar shape, so that the same marking is putted on the same portion thereof for explanation. Each of the first and second bus bars has a terminal portion and a connecting portion. The terminal portion is positioned in the mount section of the cassette block 25 so as to connect with the relays and fuses.

The connecting portion is placed on the terminal mount section 26 of the cassette block 25. At the connecting portion of the first bus bar, the terminal 91 connected through an electric wire 92 with a generator as the power source is mounted. At the connecting portion of the second bus bar, the terminal 91 connected through an electric wire 92 with a battery as the power source is mounted. Thus, the first and second bus bars are supplied electric power from the power sources through the terminals 91.

The fuse is located in the vicinity of the connecting portion and mounted at the first and second bus bars so as to connect the first and second bus bars. When a current value of electric current flowing between the first and second bus bars becomes over a predetermined value, a fuse element of the fuse is blown out and the fuse breaks electric current between the bus bars.

Some of the terminals are located in the mount section of the cassette block 25 and connected with the relays and fuses. Some of the other terminals are located in the connecting section of the cassette block 25 and connected with the terminals of the wiring harness.

The first and second bus bars of the wiring block 4 mentioned above are received partially in the bus bar receiving groove, and the connecting portions thereof are placed on the terminal mount sections 26, so that the wiring block 4 is mounted at the cassette block 25. The terminal 91 of the wiring block 4 is mounted at the terminal mount section 26, so that the wiring block 4 is connected through the terminal 91 and the electric wire 92 with the generator and the battery.

The pair of connection devices 5, 6 is structured with the one of the connection devices 5 provided at the integration 3 and the other of the connection devices 6 provided at the box main body 2 as shown in FIG. 2. The one of the connection devices 5 includes a housing 51 formed integrally with the case 31 and a terminal 52 as shown in FIG. 2.

The housing 51 is made of insulation synthetic resin. The housing 51 includes a housing main body 53 formed continuously with the lower case 33 into a cylindrical shape with a bottom, a hood 54 continued to the upper case 32 and located outside the housing main body 53, a lock projection provided at an outer surface of the hood 54 and engaged with the lock arm 24 of the box main body 2. An axis direction of the cylindrical shape of the hosing 51 is in parallel to a direction of mounting the cassette block 25 and the integration 3 to the main body 21.

The terminal 52 is formed into a strip shape with a conductive metallic material. One end of the terminal 52 along a lengthwise direction thereof is located in the housing main body 53, and the other end of the terminal 52 is located in the hood 54. The terminal 52 is connected electrically with the terminal 36 of the integration 3.

The other of the connection devices 6 includes a housing 61 formed integrally with the cassette block 25, and a terminal (not shown), as shown in FIG. 2. The housing 61 is formed into a cylindrical shape with insulation synthetic resin. An axis direction of the cylindrical shape of the housing 61 is in parallel with the direction of mounting the cassette block 25 and the integration 3 to the main body 21. The housing 61 is provided with a second rib 63 as shown in FIG. 4.

Figure 5:
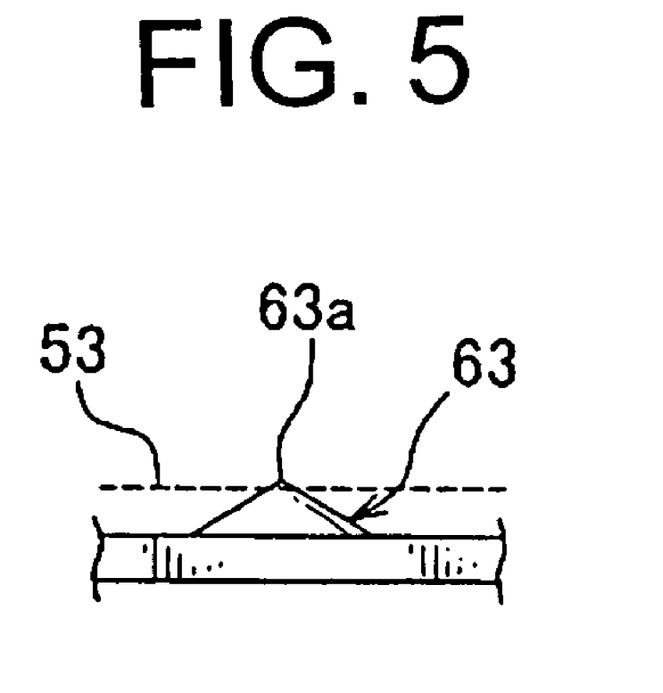
FIG. 5 is a top view expanding area A in FIG. 4.

The plural second ribs 63 are arranged on an outer surface of the housing 61. In other words, the second ribs 63 are provided at the box main body 2. The second ribs 63 are arranged on one of the outer surfaces and the other perpendicular to the one of the outer surface of the rectangular tube shaped housing 61. The plural second ribs 63 are arranged in parallel with each other along the direction of mounting the integration 3 to the main body 21. Thus, the second ribs 63 are provided at the other of connection devices 6 and located nearer to the other of the connection devices 6 than the first ribs 23 mentioned above. A cross section along a direction intersecting a lengthwise of the second rib 63 is formed into a rectangular shape. An angle at a vertex 63a of the second rib 63 is designed larger than the angle at a vertex 23a of the first rib 23, as shown in FIGS. 5, 6. The second rib 63 penetrates outwardly into an inner surface (shown with a dot line in FIG. 5) of the housing main body 53 of the one of connection devices 5, which is located outside the housing 63 as shown in FIG. 5. The first ribs 23 and the second ribs 63 correspond to a rib in the present invention.

When the integration 3 is mounted at the box main body 2, the second ribs 63 abut on the housing 53 of the one of connection devices 5 so as to be deformed thereby, and touch the inner surface of the housing 53 in this condition. As mentioned above, the angle at the vertex 63a of the second rib 63 is designed to be greater than the angle at the vertex 23a of the first rib 23, so that the second ribs 63 are structured to be stiffer (not easily deformed) than the first ribs 23. The second ribs 63 touch continuously the inner surface of the housing main body 53, and prevent rattling of the integration 3.

The terminal is formed by bending a conductive metallic sheet. The terminal includes a pair of electric contacts and a joint piece joining the pair of electric contacts to each other. The electric contact includes a rectangular cylindrical shaped main body and a spring piece located in the main body. The spring pieces push respectively a terminal piece of the first bus bar inserted in the main body and the terminal 52 of the one of connection devices 5 toward an inner surface of the main body, so that the terminal piece of the first bus bar and the terminal 52 of the one of connection devices 5 are joined. The joint piece is formed into a plate shape and joins the pair of electric contacts to each other.

When the cassette block 25 is mounted at the main body 21 of the box main body 2, the other of connection devices 6 mentioned above is positioned in the mount block 22 of the main body 21. Thereafter, when the integration 3 is mounted in the mount block, the housing 61 is arranged in the housing main body 53 and the terminals are connected to each other, so that the pair of connection devices 5, 6 is connected to each other. The terminals of the other of connection devices 6 connect the terminal piece of the first bus bar of the wiring block 4 and the terminal 52 of the one of connection devices 5 so as to supply electric power from the power source to the integration 3.

The electric connection box 1 mentioned above is assembled as following. Firstly, the cassette block 25 is mounted at the main body 21 of the box main body 2. The relays and the fuses are mounted at the mount sections of the main body 21 and the cassette block 25.

Next, when the integration 3 is inserted into the mount block 22, the first ribs 23 and the second ribs 63 abut on the integration 3 and are deformed. The second ribs 63 are not as easily deformed as the first ribs 23, so that the one of connection devices 5 is positioned securely about the other connection devices 6 in which the second ribs 63 are provided, and the pair of connection devices 5, 6 is connected securely. The first ribs 23 and the second ribs 63 in a deformed condition abut on the integration 3 so as to prevent rattling of the integration 3 in the mount block 22.

Thereafter, the connectors of the wiring harness are fitted to the connecting section of the main body 21 and the connecting section of the cassette block 25, and the lower cover 27 is mounted at the main body 21. The terminal 91 from the power source is fixed at the terminal mount section 26 by the bolt 26a, and the upper cover is mounted at the main body 21. Thus, the electric connection box 1 is assembled. The electric connection box 1 connects electrically the power source, integration 3, fuses, relays, and various electronic devices under a predetermined wiring pattern. The electric connection box 1 distributes electric power from the power source to the integration 3 and various electronic devices through the fuses and the relays.

According to the embodiment, the ribs 23, 63 are provided at the box main body 2 and deformed so as to prevent rattling of the integration 3 in the box main body 2 when the integration 3 is mounted at the box main body 2. Furthermore, the second ribs 63 from among the ribs 23, 63 arranged at the other of connection devices 6 are formed to be stiffer than the first ribs 23, which are arranged away from the other of connection devices 6 farther than the second ribs 63. Thereby, the second ribs 63 are not easily deformed and the pair of connection devices 5, 6 are preferentially positioned and connected securely. The ribs 23, 63 can prevent ratting of the integration 3 against the box main body 2.

The cross-section taken along the direction perpendicular to the direction of lengthwise of each of the ribs 23, 63 is formed into a triangle shape, so that the ribs 23, 63 can be easily deformed, and prevent rattling of the integration 3.

The angle at the vertex 63a of the second rib 63 is formed into larger than then angle 23a at the vertex of the first rib 23, the second ribs 63 can be securely formed into stiffer than then the first ribs 23.

Figure 7:
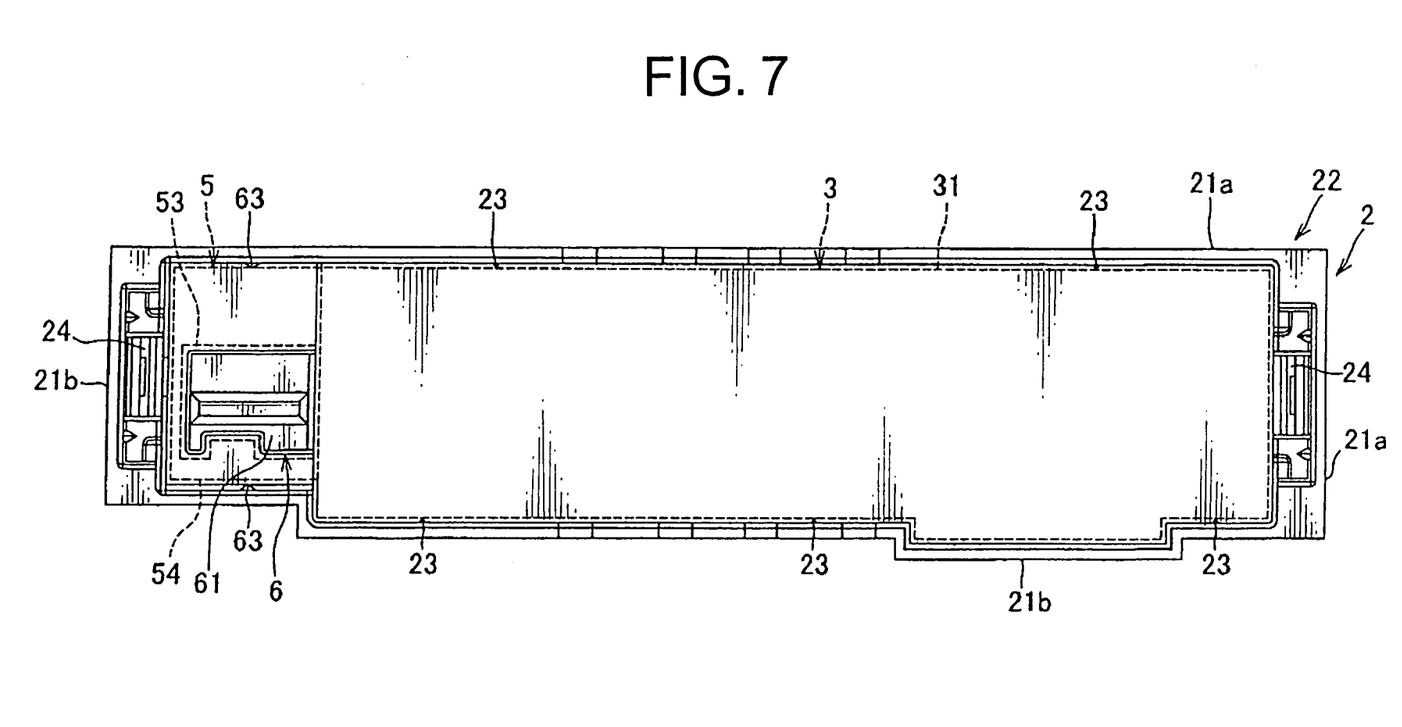
FIG. 7 is a top view of an electric connection box of a second embodiment according to the present invention.

Next, an electric connection box of the second embodiment according to the present invention will be described with reference to FIG. 7. Components which are the same as the first embodiment mentioned above are labeled with the same marking, and description is therefore omitted.

The electric connection box of the second embodiment according to the present invention differs from the first embodiment only about locations of the first ribs 23 and the second ribs 63. The plural first ribs 23 are arranged close to the lock arm 24 (away from the other of the connection devices 6) on the pair of inner walls corresponding to each other along the direction of lengthwise of the mount block 22. The plural second ribs 63 are arranged close to the other of the connection devices 6 on the pair of inner walls corresponding to each other along the direction of lengthwise of the mount block 22. In other words, the second ribs 63 are located closer to the other of the connection devices 6 than the first ribs 23.

According to the above-mentioned electric connection box, when the integration 3 is inserted into the mount block 22, the one of connection devices 5 of the integration 3 is securely positioned about the other of connection devices 6 of the mount block 22, at which the second ribs 63 are arranged, so that the pair of connection devices 5, 6 are securely connected to each other. The first ribs 23 and the second ribs 63 in deformed condition abut on the integration 3, and prevent securely rattling of the integration 3 in the mount block 22. Thus, when the second ribs 63 cannot be arranged at the other of connection devices 6, the second ribs 63 are located close to the other one of the connection devices 6, so that the pair of the connection devices 5, 6 can be securely positioned to each other and rattling of the integration 3 mounted at the box main body 2 can be securely prevented. Thereby, the same effect as the first embodiment mentioned above can be given.

According to the first and second embodiments, the ribs 23, 63 are arranged at the box main body 2. According to the present invention, the ribs 23, 63 can be arranged at the integration 3, or can be arranged both at the box main body 2 and the integration 3.

According to the first and second embodiments, the electric unit corresponds to the integration 3. According to the present invention, the electric unit is not limited to the integration 3, can be a relay unit or a fuse unit.

According to the first and second embodiments, the cross-section taken along the direction perpendicular to the direction of lengthwise of the ribs 23, 63 is formed into a triangle shape. According to the present invention, the cross-sections of the ribs 23, 63 are not limited to the triangle shape, but for example, can be formed to a quadrangular shape or a pentangular shape.

According to the first and second embodiments, the angle at the vertex 63a of each of the second ribs 63 is formed than the angle at the vertex 23a of each of the first ribs 23, so that the second ribs 63 are formed to be stiffer than the first ribs 23. According to the present invention, there is no limitation regarding how the second ribs 63 are formed to be stiffer than the first ribs 23. For example, the angle at the vertex 63a of each of the second ribs 63 is formed to be equal to the angle at the vertex 23a of each of the first ribs 23, and a slit shape hollow portion is provided in the first rib 23, thereby, the second ribs 63 can be formed to be stiffer than the first ribs 23.

It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

The invention claimed is:

1. An electric connection box, comprising:
a box main body;
an electric unit mounted at the box main body;
a pair of connection devices, one of the pair of connection devices being mounted to the box main body, the other of the pair of connection devices being mounted to the electric unit, the pair of connection devices being connected to each other when the electric unit is placed in the box main body; and
a plurality of ribs formed on at least one of the box main body and the electric unit so as to contact the other of the box main body and the electric unit continuously along a single line of contact, each of the plurality of ribs having a predefined rib shape, wherein when one of the box main body and the electric unit are brought into interfering contact with one another when the electric unit is placed in the box main body, each of the ribs is deformed and the predefined rib shape of each of the plurality of ribs is altered such that a rattle motion of the electric unit in the box main body is minimized,
wherein, ribs arranged closer to the connection device from among the plurality of ribs are formed to be stiffer than the other ribs from among the plurality of ribs other than the ribs arranged closer to the connection device.

2. The electric connection box according to claim 1, wherein, ribs which contact the connection device from among the plurality of ribs are formed to be stiffer than the other ribs from among the plurality of ribs which do not contact the connection device.

3. The electric connection box according to claim 1, wherein a cross-sectional shape of the plurality of ribs taken along a direction intersecting a lengthwise direction of the ribs is a triangle.

4. The electric connection box according to claim 3, wherein an angle at a vertex of each of the ribs arranged closer to the connection device is formed to be greater than an angle at a vertex of each of the other ribs other than the ribs arranged closer to the connection device.

* * * * *